United States Patent
Yen et al.

(10) Patent No.: US 8,056,840 B2
(45) Date of Patent: Nov. 15, 2011

(54) NANOTIZATION OF MAGNESIUM-BASED HYDROGEN STORAGE MATERIAL

(75) Inventors: Pei-Shan Yen, Taichung (TW); Chun-Ju Huang, Zhubei (TW); Jie-Ren Ku, Kaohsiung (TW); Bin-Hao Chen, Yingge Town (TW); Ming-Shan Jeng, Sijhih (TW); FangHei Tsau, Niaosong Shiang (TW); Shen-Chuan Lo, Zhubei (TW); Tu Chen, Yilan (TW)

(73) Assignee: Industrial Technology Research Institute (TW)

( * ) Notice: Subject to any disclaimer, the term of this patent is extended or adjusted under 35 U.S.C. 154(b) by 213 days.

(21) Appl. No.: 12/488,165

(22) Filed: Jun. 19, 2009

(65) Prior Publication Data
US 2010/0044478 A1    Feb. 25, 2010

(30) Foreign Application Priority Data
Aug. 25, 2008    (TW) ................ 97132385 A

(51) Int. Cl.
*B02C 11/08* (2006.01)
*B02C 21/00* (2006.01)
*B02C 23/00* (2006.01)
(52) U.S. Cl. .......................................... 241/18
(58) Field of Classification Search ........... 241/DIG. 14, 241/22, 23; 977/773, 742, 777, 775, 948; 424/445 R; 429/400; 252/500
See application file for complete search history.

(56) References Cited

U.S. PATENT DOCUMENTS

| 2005/0075245 | A1 | 4/2005 | Goddard et al. |
| 2006/0043649 | A1 | 3/2006 | Ren et al. |
| 2006/0178266 | A1* | 8/2006 | Yen et al. ............... 502/526 |
| 2006/0240256 | A1* | 10/2006 | Woo et al. ............... 428/402 |

FOREIGN PATENT DOCUMENTS

| CN | 1628899 A | * | 6/2005 |
| CN | 1699611 A | | 11/2005 |
| CN | 1743066 A | * | 3/2006 |
| CN | 1743066 A | | 3/2006 |
| CN | 1900337 | | 1/2007 |
| WO | WO 01/53550 | | 7/2001 |

OTHER PUBLICATIONS

Office Action issued Jan. 10, 2011 from corresponding application No. CN 200810149139.7.
Office Action issued Mar. 25, 2011, with English Translation from corresponding Korean Application No. 10-2009-0060483.
Office Action issued Jun. 9, 2011, in corresponding Chinese Application No. 200810149139.7.

* cited by examiner

*Primary Examiner* — David J. Walczak
*Assistant Examiner* — Jennifer C Chiang
(74) *Attorney, Agent, or Firm* — Lowe Hauptman Ham & Berner, LLP

(57) ABSTRACT

The invention utilizes a carbon nano material to nanotize a magnesium-based hydrogen storage material, thereby forming single or multiple crystals to enhance the surface to volume ratio and hydrogen diffusion channel of the magnesium-based hydrogen storage material. Therefore, the hydrogen storage material has higher hydrogen storage capability, higher absorption/desorption rate, and lower absorption/desorption temperature.

9 Claims, 1 Drawing Sheet

NANOTIZATION OF MAGNESIUM-BASED HYDROGEN STORAGE MATERIAL

CROSS REFERENCE TO RELATED APPLICATIONS

This application claims priority of Taiwan Patent Application No. 097132385, filed on Aug. 25, 2008, the entirety of which is incorporated by reference herein.

BACKGROUND OF THE INVENTION

1. Field of the Invention

The present invention relates to magnesium-based hydrogen storage materials, and in particular relates to a method for nanotizing the magnesium-based hydrogen storage materials.

2. Description of the Related Art

In the hydrogen storage material field, nanotization is a novel technique to enhance hydrogen storage capability, accelerate absorption/desorption rate, and reduce absorption/desorption temperature. Because grinding balls are not nano-scaled and are too large when compared to grinded material, it is difficult to apply conventional mechanical nanotization to material of high ductility such as magnesium-based compounds or hard materials with high additives. Additionally, a non-nano-scaled grinding ball cannot efficiently provide nano-scaled stress to grinded materials. Although non-nano-scaled ball-grinding may crush and crumble material of high ductility, the crumbled material may easily be recrystallized and form a larger dimension. As such, the ball-grinding cannot shrink the crystal size. The conventional method to reduce the ductility of the magnesium-based compounds to prevent recrystallization thereof, is to utilize liquid nitrogen. However, the low-temperature process is expensive.

Accordingly, a novel grinding method for forming nano-scaled hydrogen storage materials is called for.

BRIEF SUMMARY OF THE INVENTION

A method for nanotizing magnesium-based hydrogen storage material is provided, comprising mixing and grinding a magnesium-based compound and a carbon nano material under inert gas to form a nano-scaled magnesium-based hydrogen storage material, wherein the nano-scaled magnesium-based hydrogen storage material has a dimension of less than 100 nm.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
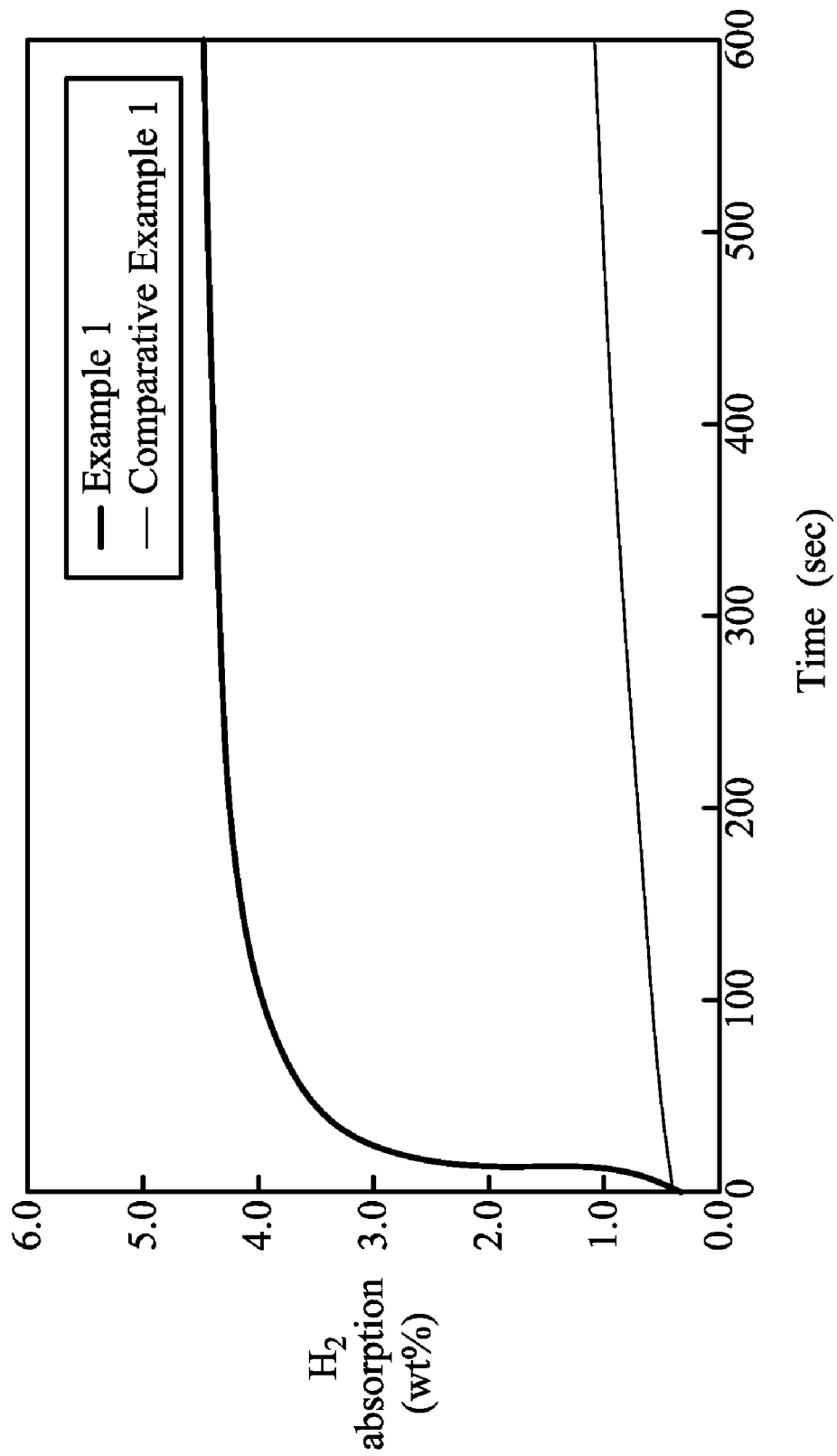
FIG. 1 shows a hydrogen storage rate comparison of Example 1 and Comparative Example 1.

The following description is of the best-contemplated mode of carrying out the invention. This description is made for the purpose of illustrating the general principles of the invention and should not be taken in a limiting sense. The scope of the invention is best determined by reference to the appended claims.

The invention provides a method for nanotizing magnesium-based hydrogen storage material, including mixing and grinding a magnesium-based compound and a carbon nano material under inert gas to form a nano-scaled magnesium-based hydrogen storage material. The definition of a nano-scaled magnesium-based hydrogen storage material is a material with dimensions less than 100 nm.

The magnesium-based compound includes magnesium or magnesium-based alloys $Mg_{1-x}A_x$, wherein A is Li, Ca, Ti, V, Cr, Mn, Fe, Co, Ni, Cu, Zn, Al, Y, Zr, Nb, Mo, In, Sn, O, Si, B, C, F, or Be, and $0<x\leq0.3$.

Suitable carbon nano material can be carbon nanotube, carbon nano powder, or combinations thereof. In one embodiment, the carbon nanotube has a diameter of 12 to 15 nm. In one embodiment, the carbon nanotube is commercially available from Aldrich. In one embodiment, the carbon nano powder has a diameter of 10 to 30 nm. In one embodiment, the carbon nano powder is commercially available from Aldrich.

In one embodiment, the magnesium-based compound and the carbon nano material have a weight ratio of 100:0.5 to 100:1. If the magnesium-based compound occupies a high ratio, hydrogen absorption temperature and grain boundary area of the hydrogen storage material will be too high. If the carbon nano material occupies a high ratio, the hydrogen storage capability of the hydrogen storage material will be reduced.

The described magnesium-based compound and the carbon nano material are firstly mixed and then ball-grinded under inert gas such as nitrogen, helium, or argon. The ball-grinding is processed by a 8-10 mm tungsten steel ball at 27-40° C. and 1-2 atm for 6-12 hours. If the ball-grinding period is longer than 12 hours, the crystal grain will overgrow. If the ball-grinding period is shorter than 6 hours, the crystal grain cannot reach nano-scale.

The described grinding process completes the so-called nano-scaled magnesium-based hydrogen storage material. Because of the smaller, harder, and rigid carbon nanotube is applied as a grinding slurry, grinding stress can be accumulated in nano-scale. The high internal stress rapidly extends the failure surface into the internal magnesium-based material to crumble it to nano-scale, thereby introducing huge lattice internal stress and high angle grain boundary into the internal magnesium-based material. Therefore, the magnesium-based hydrogen storage material structure has many grain boundary defects to be hydrogen diffusion channels, thereby accelerating the hydrogen storage/release rate of the hydrogen storage material. As a result, the effective hydrogen storage amount is close to the theoretical maximum hydrogen storage amount, the hydrogen absorption/desorption rate is enhanced, and the hydrogen absorption/desorption temperature is reduced. In one embodiment, the nano-scaled magnesium-based hydrogen storage material has hydrogen absorption/desorption rate greater than 0.0073 L/s, when between 100 to 200° C. In another embodiment, the nano-scaled magnesium-based hydrogen storage material has a hydrogen absorption/desorption rate of 0.0051 L/s to 0.0073 L/s at room temperature (about 25° C.).

In another embodiment, the described method further adds a hard material of high strength and high non-ductility in the grinding process. The grinding sequence is not limited to the examples, and the mixture of the hard material and carbon nano material can be firstly grinded, and then added the magnesium-based compound for further grinding. Alternatively, the mixture of the magnesium-based material and the carbon nano material can be firstly grinded, and then added the hard material for further grinding. Furthermore, the mixture of the magnesium-based material, the carbon nano material, and the hard material can be simultaneously grinded. After the grinding step, the hard material will be nano-scaled to a dimension of less than 100 nm, and the nano-scaled hard material is evenly dispersed in the nano-scaled magnesium-based hydrogen storage material. The purpose of introducing the hard material is to enhance the mechanical strength of the hydrogen storage material. The hard material is V, Ti, Fe, Co, Nb, Ca, Cs, Mn, Ni, Ce, Y, La, Pd, Hf, K, Rb, Rh, Ru, Zr, Be, Cr, Ge, Si, Li, or combinations thereof, or alloys thereof. If Fe, Ti, or Ni is selected, the hard material will further catalyze hydrogen molecules into atoms and store the atoms. The magnesium-based compound and the hard material have a weight ratio of 100:5 to 100:30. If the hard material amount is too high, it will degrade the performance of the hydrogen storage material.

EXAMPLE AND COMPARATIVE EXAMPLE

Example 1

0.7 g of magnesium (commercially available from Well-Being Enterprise Co., Taiwan), 0.3 g of FeTi (commercially available from SUMMIT-TECH RESOURCE CORP., Taiwan), and 0.01 g of carbon nanotube (commercially available from Aldrich) were ball-grinded under argon. The ball-grinding was processed by a tungsten steel ball at 27° C. and 1 atm for 6 hours. Referring to the XRD diffraction and scanning transmission electron microscope (STEM) results, the ball-grinded Mg had an average crystal dimension of less than 100 nm. As shown in FIG. 1, the hydrogen storage rate of the ball-grinded material was calculated by measuring the hydrogen pressure, concentration, and temperature.

Comparative Example 1

Comparative Example 1 is similar to Example 1, wherein the only difference in Comparative Example 1 is no addition of carbon nanotube. Referring to the XRD diffraction and scanning transmission electron microscope (STEM) results, the ball-grinded Mg had an average crystal dimension greater than 100 nm. As shown in FIG. 1, the hydrogen storage rate of the ball-grinded material was calculated by measuring the hydrogen pressure, concentration, and temperature.

As shown in the hydrogen storage rate comparison of FIG. 1, the product from the ball-grinding process with the carbon nanotube in Example 1 is better than that without the carbon nanotube in the Comparative Example 1.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for nanotizing magnesium-based hydrogen storage material, comprising:
   mixing and grinding a magnesium or magnesium-based alloy $Mg_{1-x}A_x$ and a carbon nano material under inert gas to form a nano-scaled magnesium-based hydrogen storage material,
   wherein the nano-scaled magnesium-based hydrogen storage material has a dimension of less than 100 nm,
   A is Li, Ca, Ti, V, Cr, Mn, Fe, Co, Ni, Cu, Zn, Al, Y, Zr, Nb, Mo, In, Sn, O, Si, B, C, F, or Be, and $0<x\leq0.3$; and
   wherein the carbon nano material comprises carbon nanotube, single-wall carbon nanotube, multi-wall carbon nanotube, or combinations thereof.

2. The method as claimed in claim 1, wherein the inert gas comprises nitrogen or helium.

3. The method as claimed in claim 1, wherein the magnesium-based compound and the carbon nano material have a weight ratio of 100:0.5 to 100:1.

4. The method as claimed in claim 1, wherein the grinding step is processed for a period of 6 to 12 hours, at a temperature of 27 to 40° C., and under a pressure of 1 to 2 atm.

5. The method as claimed in claim 1, wherein the nano-scaled magnesium-based hydrogen storage material has a hydrogen absorption/desorption rate greater than 0.0073 L/s when between 100 to 200° C.

6. The method as claimed in claim 1, wherein the nano-scaled magnesium-based hydrogen storage material has a hydrogen absorption/desorption rate of 0.0051 L/s to 0.0073 L/s at room temperature.

7. The method as claimed in claim 1, further comprising adding a second material in the grinding step, wherein the second material is a nano-scale material.

8. The method as claimed in claim 7, wherein the second material is V, Ti, Fe, Co, Nb, Ca, Cs, Mn, Ni, Ce, Y, La, Pd, Hf, K, Rb, Rh, Ru, Zr, Be, Cr, Ge, Si, Li, or the combinations thereof, or alloys thereof.

9. The method as claimed in claim 7, wherein the magnesium-based compound and the second material have a weight ratio of 100:5 to 100:30.

* * * * *